United States Patent
Brian et al.

(10) Patent No.: US 11,003,759 B2
(45) Date of Patent: May 11, 2021

(54) APPLIANCE WITH CONTROL BOARD AUTHENTICATION

(71) Applicant: Haier US Appliance Solutions, Inc., Wilmington, DE (US)

(72) Inventors: Joseph Mark Brian, Louisville, KY (US); Richard Dean Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 163 days.

(21) Appl. No.: 16/174,362

(22) Filed: Oct. 30, 2018

(65) Prior Publication Data
US 2020/0134162 A1 Apr. 30, 2020

(51) Int. Cl.
*G06F 21/44* (2013.01)
*G05B 19/042* (2006.01)
*G06F 21/73* (2013.01)

(52) U.S. Cl.
CPC ......... *G06F 21/44* (2013.01); *G05B 19/0423* (2013.01); *G06F 21/73* (2013.01); *G05B 2219/25252* (2013.01); *G05B 2219/25257* (2013.01)

(58) Field of Classification Search
CPC ...... G05B 19/0423; G05B 2219/25252; G05B 2219/25257; G06F 21/44; G06F 21/73; G06F 11/006; H04L 2209/30; H04L 2209/60; H04L 9/0822; H04L 9/0825; H04L 9/083; H04L 9/085; H04L 9/0897; H04L 9/14; H04L 9/30; H04L 9/3213; H04L 9/3226; H04L 9/3234; H04L 9/3236; Y10S 706/916
See application file for complete search history.

(56) References Cited

U.S. PATENT DOCUMENTS

| | | | |
|---|---|---|---|
| 5,483,658 A * | 1/1996 | Grube | G06Q 10/087 726/29 |
| 8,631,247 B2 | 1/2014 | O'Loughlin et al. | |
| 9,165,133 B2 | 10/2015 | La Fever et al. | |
| 2009/0300148 A1 * | 12/2009 | Gomes | G06F 15/177 709/220 |
| 2017/0007917 A1 * | 1/2017 | Back | A63F 9/24 |
| 2019/0187638 A1 * | 6/2019 | Arrojula | G05B 19/0426 |

OTHER PUBLICATIONS

Infineon Technologies, Authentication and brand protection, https://www.infineon.com/cms/en/applications/smart-card-and-security/authentication-and-brand-protection/, Jan. 8, 2018, 7.

* cited by examiner

*Primary Examiner* — Abiy Getachew
(74) *Attorney, Agent, or Firm* — Dority & Manning, P.A.

(57) ABSTRACT

A method for authenticating control boards in an appliance includes reading a serial number from a memory of a first control board positioned within the appliance, reading a serial number from a memory of a second control board positioned within the appliance and in communication with the first control board, comparing the serial number from the memory of the first control board to the serial number from the memory of the second control board, and authenticating the first and second control boards when the serial number from the memory of the first control board matches the serial number from the memory of the second control board.

16 Claims, 2 Drawing Sheets

APPLIANCE WITH CONTROL BOARD AUTHENTICATION

FIELD OF THE INVENTION

The present subject matter relates generally to appliances and control boards for appliances.

BACKGROUND OF THE INVENTION

Appliances generally include one or more control boards that regulate operation of the appliance. Over time, the control boards can require servicing or replacement for a variety of reasons. Servicing or replacing a control board with a proper replacement control board allows the appliance to continue operating normally.

However, certain appliance owners unknowingly utilize aftermarket or pirated replacement control boards, and aftermarket or pirated control boards have drawbacks. For example, a mismatch between hardware and software can induce sporadic appliance behavior. Malfunctioning appliances are displeasing and can reflect negatively on an appliance manufacturer.

BRIEF DESCRIPTION OF THE INVENTION

Aspects and advantages of the invention will be set forth in part in the following description, or may be apparent from the description, or may be learned through practice of the invention.

In a first example embodiment, a method for authenticating control boards in an appliance includes reading a serial number from a memory of a first control board positioned within the appliance, reading a serial number from a memory of a second control board positioned within the appliance and in communication with the first control board, comparing the serial number from the memory of the first control board to the serial number from the memory of the second control board, and authenticating the first and second control boards when the serial number from the memory of the first control board matches the serial number from the memory of the second control board.

In a second example embodiment, a method for authenticating control boards in an appliance includes reading a serial number from a memory of a main control board positioned within the appliance, reading a serial number from a memory of each of one or more sub-control boards positioned within the appliance and in communication with the main control board, comparing the serial number from the memory of the main control board to each serial number from the memory of the one or more sub-control boards, and authenticating the main control board and the one or more sub-control boards when the serial number from the memory of the main control board matches each serial number from the memory of the one or more sub-control boards.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
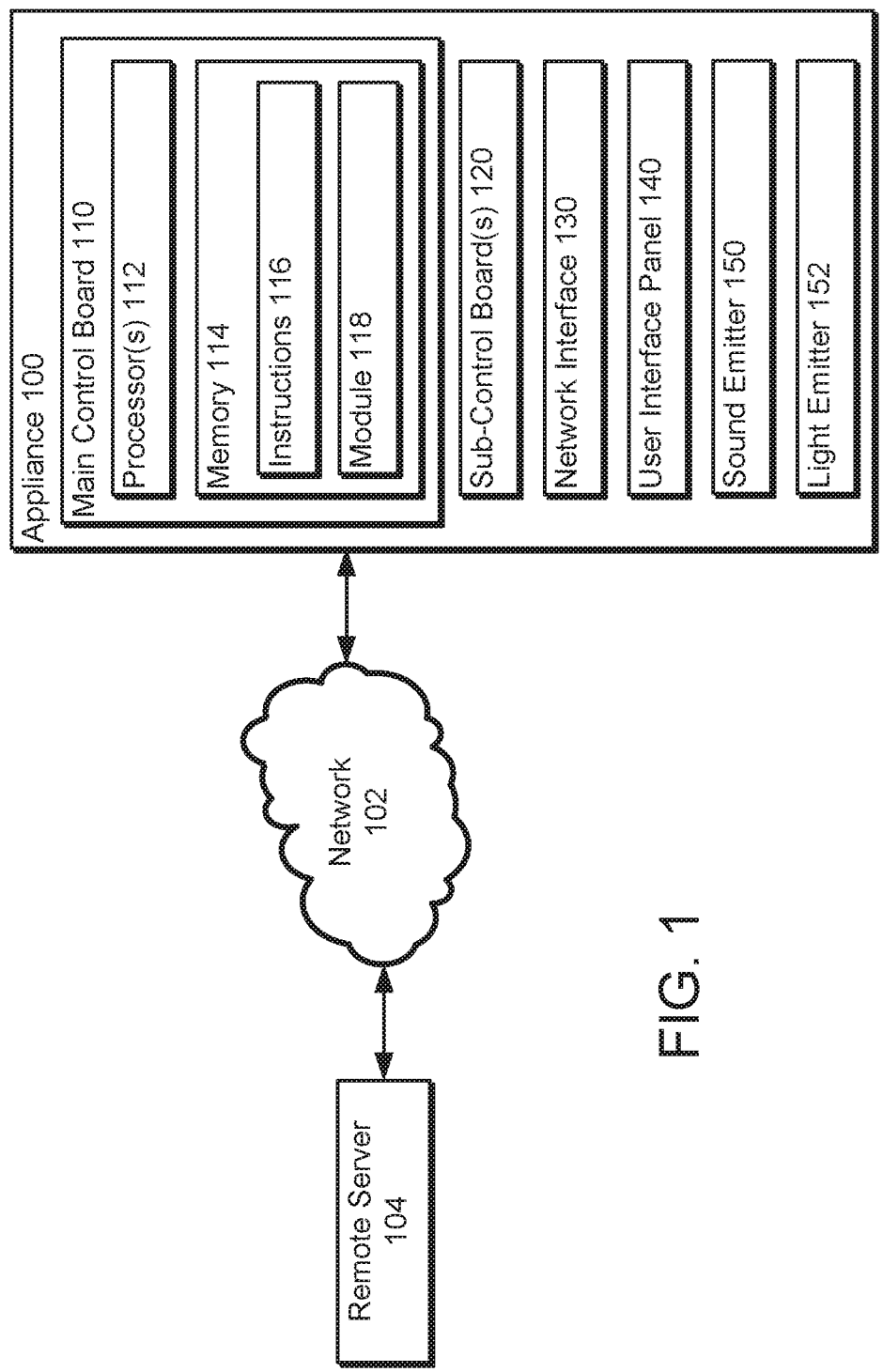
FIG. 1 is a schematic view of an appliance with one or more control boards according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic view of an appliance 100 according to an example aspect of the present subject matter. As used herein, an appliance can be any machine or device for performing a specific task, including, without limitation, a clothes dryer, a clothes washer, a dishwasher, a refrigerator, a stove, an oven, a microwave, a cooktop, a range hood, a window AC unit, an HVAC system controller, a water heater, etc. As discussed in greater detail below, appliance 100 includes features for authenticating control boards within appliance 100.

Appliance 100 is connectable to a network 102. Thus, e.g., appliance 100 may communicate with a remote server 104 via network 102. In particular, appliance 100 may receive data from remote server 104 via network 102. To connect to network 102, appliance 100 includes a network interface 130. Network interface 130 of appliance 100 can include any suitable components for interfacing with one more networks, such as network 102. For example, network interface 130 of appliance 100 may include transmitters, receivers, ports, controllers, antennas, or other suitable components.

Network interface 130 may establish communication with network 102 via a connection through any suitable medium, e.g., wired or wireless. Network 102 may be any type of communications network, such as a local area network (e.g. intranet), wide area network (e.g. Internet), or some combination thereof. In general, communication between a main control board 110 and network 102 may be carried via associated network interfaces using any type of connection, using a variety of communication protocols (e.g. TCP/IP, HTTP), encodings or formats (e.g. HTML, XML), and/or protection schemes (e.g. VPN, secure HTTP, SSL). In particular, the network 102 may be a wireless local area network (WLAN) configured to conform to IEEE 802.11.

Appliance 100 includes main control board 110 and one or more sub-control boards 120 positioned within appliance 100. Main control board 110 includes one or more processors 112 and a memory 114. Each of the one or more sub-control boards 120 may also include respective one or more processors and memory, e.g., in the manner described below for main control board 110. Main control board 110 and one or more sub-control boards 120 may collectively form a controller of appliance 100. Thus, main control board 110 and one or more sub-control boards 120 may be configured to implement various programs or methods to operate appliance 100. Input/output ("I/O") signals may be routed between main control board 110, one or more sub-control boards 120 and various operational components of appliance 100 along wiring harnesses that may be routed within appliance 100.

The processor(s) 112 of appliance 100 can be any suitable processing device, such as a microprocessor, microcontroller, integrated circuit, or other suitable processing device. The memory 114 of appliance 100 can include any suitable computing system or media, including, but not limited to, non-transitory computer-readable media, RAM, ROM, hard drives, flash drives, or other memory devices. The memory 114 of appliance 100 can store information accessible by processor(s) 112 of appliance 100, including instructions 116 that can be executed by processor(s) 112 to control various components of appliance 100 to provide appliance functionality. Processor(s) 112 and memory 114 of appliance 100 may be mounted on a printed circuit board (PCB). Thus, e.g., it will be understood that each of main control board 110 and one or more sub-control boards 120 may be a separate PCB.

A module 118 is included or stored in memory 114 of appliance 100. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media. Thus, while module 118 is shown stored in memory 114 of appliance 100 in the example embodiment shown in FIG. 1, module 118 may be stored in or implemented by any other suitable component of system 100 in alternative example embodiments.

Appliance 100 also includes a user interface panel 140. User interface panel 140 is located within convenient reach of a user of appliance 100. User interface panel 140 includes various input components, such as one or more of a variety of touch-type controls, electrical, mechanical or electromechanical input devices including knobs, rotary dials, push buttons, and touch pads. The user interface panel 140 may include a display component, such as a digital or analog display device, designed to provide operational feedback to a user.

Various appliance features of appliance 100 may be activated/deactivated by a user manipulating the input components on user interface panel 140. Thus, e.g., when appliance 100 is a cooktop or oven appliance, a user may manipulate knobs or buttons on user interface panel 140 to activate and deactivate heating elements of the appliance. As another example, when appliance 100 is a refrigerator appliance, a user may manipulate buttons on user interface panel 140 to adjust the sealed system set temperature of the appliance. As yet another example, when appliance 100 is a washing machine or dryer appliance, a user may manipulate knobs or buttons on user interface panel 140 to start treatment of clothing items within the appliance.

User interface panel 140 may include a sound emitter 150 for generating an audible alert. Sound emitter 150 may be a speaker, piezo buzzer, etc. User interface panel 140 may also include a light emitter 152 for generating a visual alert. Light emitter 152 may be a light emitting diode (LED), icon or image on a display, such as an liquid crystal display or LED display, etc. Sound emitter 150 and/or light emitter 152 may be activated to communicate to a user of appliance 100.

Figure 2:
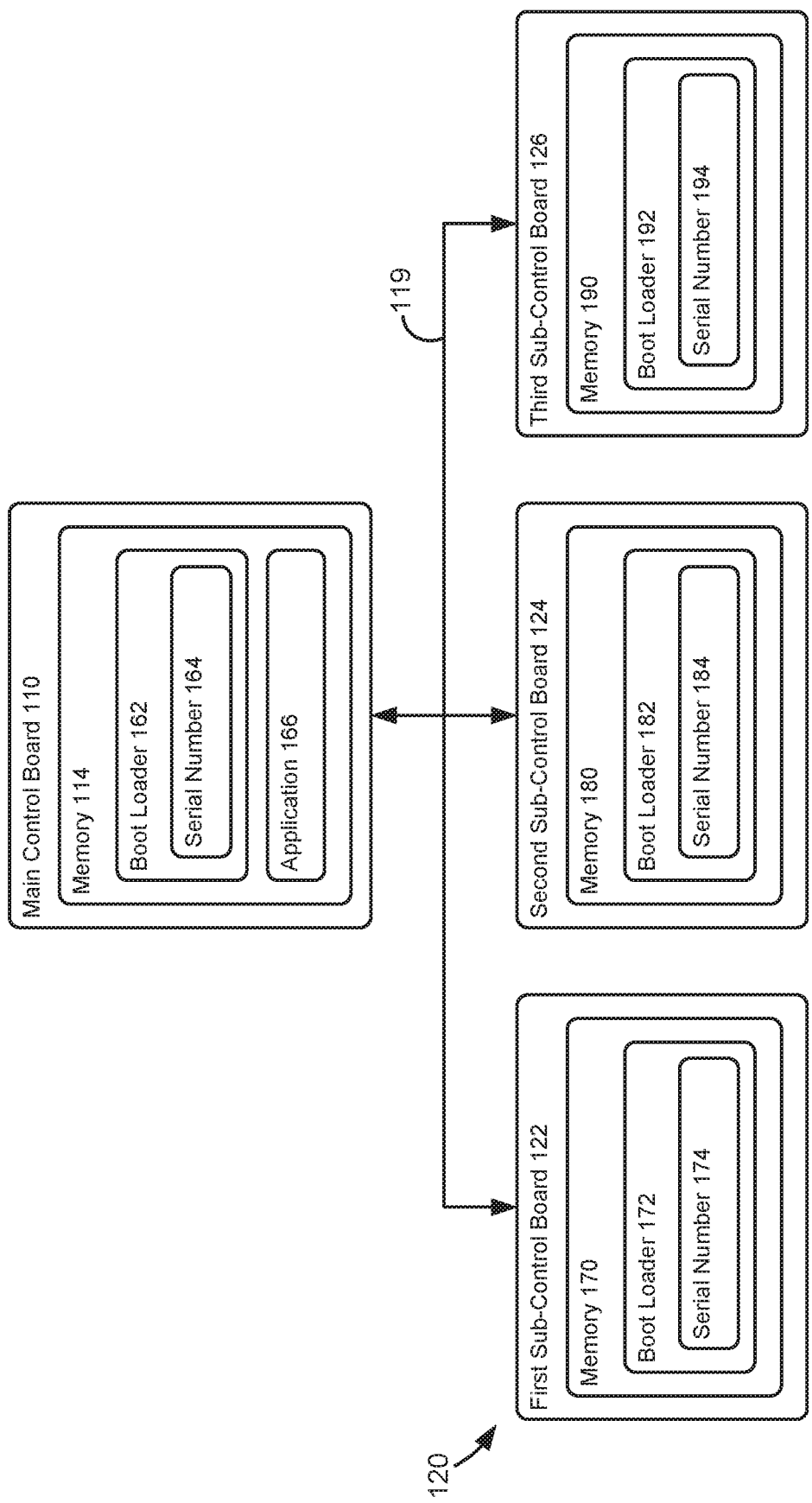
FIG. 2 is a schematic view of certain components of the example appliance of FIG. 1.

FIG. 2 is a schematic view of certain components of appliance 100. As may be seen in FIG. 2, main control board 110 may include a serial number 164 within memory 114 of main control board 110. In particular, serial number 164 may be stored within a boot loader parametric data area 162 of memory 114. In alternative example embodiments, serial number 164 may be stored within any other, e.g., non-volatile and/or read only, portion of memory 114.

Serial number 164 may correspond to a series of digits (e.g., including one or more of numbers, letters, symbols, etc.) that is unique to appliance 100. Thus, e.g., serial number 164 within memory 114 of main control board 110 may be different from the serial number within a memory of a main control board in another appliance. Serial number 164 may be originally written into memory 114 of main control board 110 by a manufacturer of appliance 100. During replacement of main control board 110, serial number 164 may be written into memory 114 of the replacement main control board 110 by an authorized service technician.

In FIG. 2, appliance 100 includes three sub-control boards 120, more particularly a first sub-control board 122, a second sub-control board 124 and a third sub-control board 126. It will be understood that the number of sub-control boards 120 shown in FIG. 2 is provided by way of example only. Thus, appliance 100 may include less or more sub-control boards 120 in alternative example embodiments. As shown in FIG. 2, sub-control boards 120 may communicate with main control board 110 via a wiring harness 119 that extends between and connects sub-control boards 120 and main control board 110 within appliance 100.

Like main control board 110, each sub-control board 120 includes a serial number within a memory of the sub-control board 120. For example, as shown in FIG. 2, first sub-control board 122 includes a serial number 174 within a memory 170 of first sub-control board 122, second sub-control board 124 includes a serial number 184 within a memory 180 of second sub-control board 124, and third sub-control board 126 includes a serial number 194 within a memory 190 of third sub-control board 126. In particular, serial number 174 may be stored within a boot loader parametric data area 172 of memory 170 in first sub-control board 122, serial number 184 may be stored within a boot loader parametric data area 182 of memory 180 in second sub-control board 124, and serial number 194 may be stored within a boot loader parametric data area 192 of memory 190 in third sub-control board 126. Each serial number 174, 184, 194 in sub-control boards 120 may correspond to a series of digits (e.g., including one or more of numbers, letters, symbols, etc.) that is unique to appliance 100. Serial numbers 174, 184, 194 may be originally written into memories 170, 180, 190 of sub-control boards 120 by the manufacturer of appliance 100. During replacement of one or more of sub-control boards 120, a respective one of serial numbers 174, 184, 194 may be written into the memory of each replacement sub-control board 120.

An example method for authenticating control boards in an appliance will now be described. The controller of appliance 100 may run the control board authentication method in order to ensure proper operation of appliance 100. As an example, the controller of appliance 100 may run the control board authentication method each time that appliance 100 is activated or at a suitable periodic interval. The control board authentication method may advantageously limit and/or prevent appliance malfunctioning due to aftermarket and/or pirated replacement control boards. It will be understood that while discussed below in a certain sequence, the control board authentication method may be performed in other suitable sequences in alternative example embodiments. Thus, the control board authentication method is not limited to the particular sequence described below.

Initially, serial number 164 is read from memory 114 of main control board 110. Serial numbers 174, 184, 194 are also read from memories 170, 180, 190 of sub-control boards 120. Serial number 164 from memory 114 of main control board 110 is then compared to serial numbers 174, 184, 194 from memories 170, 180, 190 of sub-control boards 120. Main control board 110 and sub-control boards 120 are authenticated when serial number 164 from memory 114 of main control board 110 matches serial numbers 174, 184, 194 from memories 170, 180, 190 of sub-control boards 120. When main control board 110 and sub-control boards 120 are authenticated, appliance may operate normally due to appropriate main control board 110 and sub-control boards 120 within appliance 100.

In contrast, operation of appliance 100 may be adjusted when serial number 164 from memory 114 of main control board 110 does not match one or more of the serial numbers 174, 184, 194 from memories 170, 180, 190 of sub-control boards 120. In addition, operation of appliance 100 may be adjusted when one or more of serial number 164 from memory 114 of main control board 110 and one or more of the serial numbers 174, 184, 194 from memories 170, 180, 190 of sub-control boards 120 is blank or in a factory default setting. As may be seen from the above, the control board authentication method may detect when serial numbers in main control board 110 and sub-control boards 120 are mismatched or blank and, e.g., take appropriate action. As an example, the controller of appliance 100 may activate a user alert on appliance 100 to inform the user of appliance 100 of an aftermarket and/or pirated replacement control board. In particular, one or more of sound emitter 150 and light emitter 152 may be activated to communicate to the user of appliance 100 of the aftermarket and/or pirated replacement control board. As another example, the controller of appliance 100 may deactivate one or more operational components of appliance 100 in response to detecting the aftermarket and/or pirated replacement control board. In certain example embodiments, the controller of appliance 100 may render appliance 100 inoperable in response to detecting the aftermarket and/or pirated replacement control board. As yet another example, appliance 100 may transmit a notification to remote server 104 via network 102 in response to detecting the aftermarket and/or pirated replacement control board. In particular, a manufacturer of appliance 100 may receive the notification, e.g., in order to assist the manufacturer with tracking aftermarket and/or pirated replacement control boards. When appliance 100 is not connected to network 102, the notification may be extracted when a service tool is physically connected to appliance 100. The notification may include information on the expected serial number and the actual mismatching serial number(s), e.g., in order to improve traceability of the aftermarket and/or pirated replacement control boards.

In general, serial numbers may be written onto original main control board 110 and sub-control boards 120 at a factory. In particular, a single matching serial number (e.g., and model number) may be saved into the memory of main control board 110 and each sub-control board 120 at the factory during manufacture of appliance 100. During operation of appliance a serial number audit may be performed between main control board 110 and sub-control boards 120. The serial number audit may include checking the serial number of main control board 110 as well as the serial numbers of all detected sub-control boards 120 on a common bus. The serial number audit may allow robust detection of serial number anomalies that can be classified according to severity. Depending on the classification, various responsive actions can be taken that range from "do nothing" to "degrade performance" to "stop functioning." Results of the serial number audit can additionally be aggregated and transmitted to a third party for analysis.

To allow installation of replacement control boards, authorized service technicians may be provided with a software tool to authenticate a replacement control board. The tool detects and writes the correct serial number to any new control board. As an example, a service technician may scan a QR code, bar code, serial number, etc. that is printed on or mounted to appliance 100 to establish the correct serial number, and then write the detected serial number in the memory of a control board.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for authenticating control boards in an appliance, comprising: reading a serial number from a memory of a first control board, the first control board positioned within the appliance; reading a serial number from a memory of a second control board, the second control board positioned within the appliance, the second control board in communication with the first control board; comparing the serial number from the memory of the first control board to the serial number from the memory of the second control board; and authenticating the first and second control boards when the serial number from the memory of the first control board matches the serial number from the memory of the second control board, further comprising adjusting operation of the appliance when one or both of the serial number from the memory of the first control board and the serial number from the memory of the second control board is blank.

2. The method of claim 1, further comprising adjusting operation of the appliance when the serial number from the memory of the first control board does not match the serial number from the memory of the second control board.

3. The method of claim 2, wherein adjusting operation of the appliance comprises activating a user alert on the appliance.

4. The method of claim 3, wherein the user alert is one or more of a light emitter and a sound emitter.

5. The method of claim 2, wherein adjusting operation of the appliance comprises deactivating one or more operational components of the appliance.

6. The method of claim 1, wherein the second control board is spaced from the first control board within the appliance.

7. The method of claim 1, further comprising transmitting a notification when the serial number from the memory of the first control board does not match the serial number from the memory of the second control board.

8. The method of claim 1, wherein reading the serial number from the memory of the first control board comprises reading the serial number from a boot loader parametric data area of the memory of the first control board.

9. A method for authenticating control boards in an appliance, comprising: reading a serial number from a memory of a main control board, the main control board positioned within the appliance; reading a serial number from a memory of each of one or more sub-control boards, the one or more sub-control boards positioned within the appliance, each of the one or more sub-control boards in communication with the main control board; comparing the serial number from the memory of the main control board to each serial number from the memory of the one or more sub-control boards; and authenticating the main control board and the one or more sub-control boards when the serial number from the memory of the main control board matches each serial number from the memory of the one or more sub-control boards, further comprising transmitting a notification when the serial number from the memory of the main control board does not match each serial number from the memory of the one or more sub-control boards.

10. The method of claim 9, further comprising adjusting operation of the appliance when the serial number from the memory of the main control board does not match each serial number from the memory of the one or more sub-control boards.

11. The method of claim 10, wherein adjusting operation of the appliance comprises activating a user alert on the appliance.

12. The method of claim 11, wherein the user alert is one or more of a light emitter and a sound emitter.

13. The method of claim 12, wherein adjusting operation of the appliance comprises deactivating one or more operational components of the appliance.

14. The method of claim 9, wherein each of the one or more sub-control boards is spaced from the main control board within the appliance.

15. The method of claim 9, wherein reading the serial number from the memory of the main control board comprises reading the serial number from a boot loader parametric data area of the memory of the main control board.

16. The method of claim 9, further comprising adjusting operation of the appliance when one or more of the serial number from the memory of the main control board and the serial number from the memory of the one or more sub-control boards is blank.

\* \* \* \* \*